United States Patent
Borcov

(10) Patent No.: US 11,328,035 B2
(45) Date of Patent: May 10, 2022

(54) METHOD FOR DEVELOPING WEBSITES AND PROVIDING TAILORED ASSISTANCE FOR DEVELOPMENT

(71) Applicant: UAB Site.Pro, Klaipèda (LT)

(72) Inventor: Filip Borcov, Klaipèda (LT)

(73) Assignee: UAB SITE.PRO, Klaipèda (LT)

( * ) Notice: Subject to any disclaimer, the term of this patent is extended or adjusted under 35 U.S.C. 154(b) by 0 days.

(21) Appl. No.: 16/955,485

(22) PCT Filed: Dec. 12, 2018

(86) PCT No.: PCT/IB2018/059907
§ 371 (c)(1),
(2) Date: Jun. 18, 2020

(87) PCT Pub. No.: WO2019/123114
PCT Pub. Date: Jun. 27, 2019

(65) Prior Publication Data
US 2021/0097116 A1 Apr. 1, 2021

(30) Foreign Application Priority Data
Dec. 20, 2017 (LT) ........................................ 2017 542

(51) Int. Cl.
*G06F 16/958* (2019.01)
*G06F 16/957* (2019.01)
*G06F 8/36* (2018.01)

(52) U.S. Cl.
CPC .............. *G06F 16/958* (2019.01); *G06F 8/36* (2013.01); *G06F 16/957* (2019.01)

(58) Field of Classification Search
CPC .................................................... G06F 16/958
See application file for complete search history.

(56) References Cited

U.S. PATENT DOCUMENTS

2002/0078057 A1 6/2002 Wang et al.
2008/0082955 A1 4/2008 Andreessen et al.
(Continued)

FOREIGN PATENT DOCUMENTS

WO 03/048967 6/2003

OTHER PUBLICATIONS

International Search Report for PCT/IB2018/059907 dated Mar. 19, 2019 (three pages).

*Primary Examiner* — James J Debrow
(74) *Attorney, Agent, or Firm* — Tutunjian & Bitetto, P.C.

(57) ABSTRACT

A method is provided for developing websites and providing tailored assistance for development. The method for developing a website is based on copying of the existing website, analysing, unifying and moving of the copied website into an operating environment. In the operating environment, the developer can change, modify and edit elements of the copied website, thus developing a new website. When a new website is developed, an equipment implementing the method adjusts parameters, settings of the website according to the server on which the website is planned to be hosted. After adjusting parameters of the new website, the website is moved onto the server for continuous operation, online displaying. When the equipment implementing the method has analysed the copied website and moved it into the operating environment, the developer can use tailored assistance for website development, which provides further steps of development according to a specific situation of the developer.

7 Claims, 1 Drawing Sheet

(56) References Cited

U.S. PATENT DOCUMENTS

| | | | |
|---|---|---|---|
| 2008/0178081 A1* | 7/2008 | Reshef et al. | G06F 3/00 |
| 2013/0326333 A1 | 12/2013 | Hashmi | |
| 2015/0317405 A1* | 11/2015 | Manchester | G06F 17/30 |
| 2017/0090734 A1* | 3/2017 | Fitzpatrick | G06F 3/0484 |

\* cited by examiner

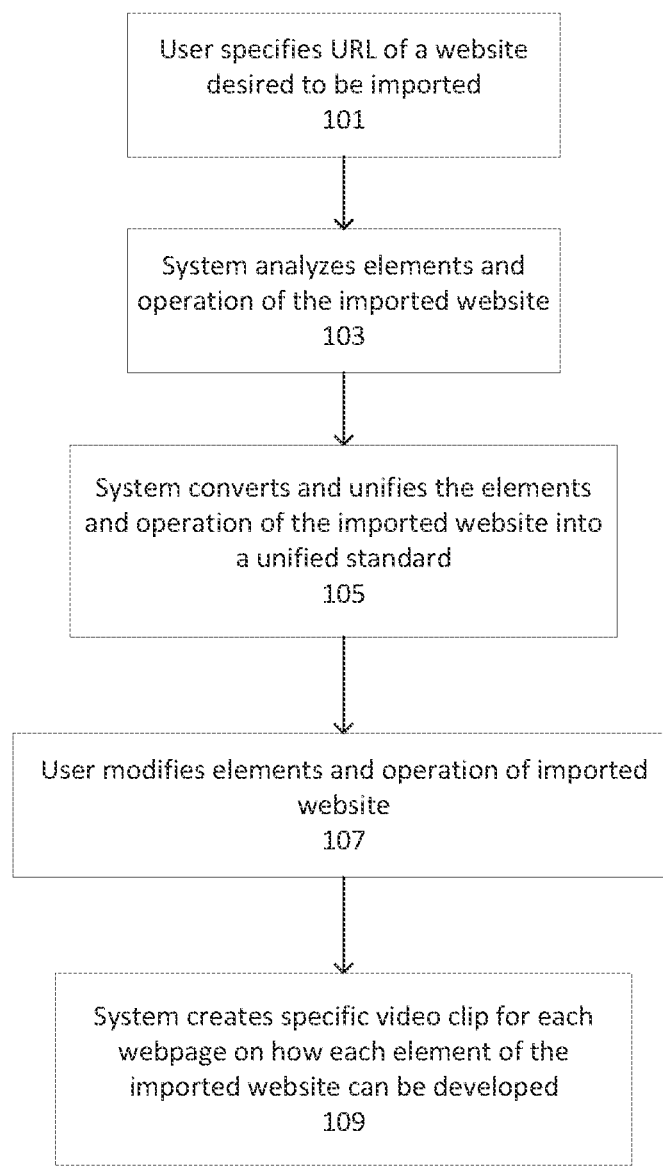

METHOD FOR DEVELOPING WEBSITES AND PROVIDING TAILORED ASSISTANCE FOR DEVELOPMENT

FIELD OF THE INVENTION

The invention relates to a method for developing a website that completely replaces a person in creative processes, for example: it performs website development from any platform or provides tailored multimedia assistance.

DESCRIPTION OF THE RELATED ART

This invention provides a method for building, developing websites. The method for building is based on copying of existing websites. The copied website is analysed, processed, regardless of the programming language in which the website was developed; elements of the website are unified and placed into an environment in which a simple user, designer who is not skilled in website development can modify a view, features of the website, etc., i.e. he can modify the copied website until it will be suitable for the developer. There is a possibility to use automatic assistance, which provides information, which helps to build, develop the desired website, in various formats (text, static images, dynamic images). In each specific case, the content of assistance provided is developed for a specific case, and therefore it exactly matches the situation where the website developer operates. Both the development of websites by copying and provision of assistance are done on the same principle: actions performed are customized to the specific situation of the website developer.

Document US2008082955A1 (published on 3 Apr. 2008) provides a solution for cloning a website but the cited method does not analyse the copied website, does not unify elements of the website, there is no possibility to improve, customized the copied website to your own needs and does not provide an automatic error correcting method.

Document US2002078057A1 (published on 20 Jun. 2002) provides a method for copying a website, where the original code of the existing website is used for copying, a model of the website is not analysed, a possibility to easily change, customize the website to your own needs (it is needed to understand the code of the website) is not provided. As mentioned, the original code is used for copying, thus if there is no possibility to get the original code (usually there is no such possibility), copying may fail. In the present invention, a general model of the website is analysed, regardless of a code or code programming language. Also, the cited document does not provide tailored assistance for development.

The presented analogues of the related art are characterized by the following deficiencies:
- copying is suitable only for the website developed using one specific code, i.e. there is no possibility to unify the programming code when copying;
- the website code is analysed and copied and not the real model (logical structure) of the entire website, wherefore, after copying, there is no possibility to easily (without changing the code itself) modify elements of the website, i.e. it is not possible to easily customize the website to your own needs;
- assistance means suitable to the specific situation are not presented;
- only a method for copying the website is presented, possibilities to change, improve, customize the copied content to your own needs are not presented;
- the website code that you may not be able to use is analysed and copied, which may result in failing to copy the website;
- methods of tailored assistance for development are not provided.

This invention provides a technical solution that does not have the above deficiencies.

BRIEF DESCRIPTION OF THE DRAWING

FIG. 1 is an exemplary flow diagram of a method for developing a website according to an embodiment of the present invention.

SUMMARY OF THE INVENTION

This invention provides a method for developing websites and providing tailored assistance for development. The method for developing a website is based on copying of the existing website, analysing, unifying and moving of the copied website into an operating environment. In the operating environment, the developer can change, modify, and edit elements of the copied website, thus developing a new website. When the new website is developed, the equipment that implements the method, adjusts parameters, settings of the website according to the website of the server on which the website is planned to be hosted. After adjusting settings of the new website, the website is transferred to the server for continuous operation, online demonstration.

When the equipment implementing the method has analysed the copied website and moved it into the operating environment, the developer has the possibility to use tailored assistance for website development, which provides next steps of development according to the specific situation of the developer.

Means implementing the method have artificial intelligence means that analyse actions of different developers, systematize them and develop the most common sequences of actions. In the long run, the equipment can provide next steps of website development by using elements of the copied website, i.e. the developer receives tailored assistance for the specific website.

The main advantage of this method is that it can be used, i.e. developers of websites, developers who are not skilled in the field at all. Both the operation of the equipment and the interface with the user and assistance are provided in a very simple manner, which does not require skills of a user.

DETAILED DESCRIPTION

This invention provides a method for developing, building websites. Website development is performed by specifying the operating website on internet that is copied, migrated into an operating environment, where you can change, edit elements, structure, operation of the copied website, correct some errors and host the arranged website for displaying on the internet. In the operating environment, together with the arrangement of the copied website, there is a possibility to use assistance that is tailored to each specific case selected by the developer, user of the website, i.e. assistance is personalized, tailored and uses elements of the website.

The method is implemented using software means running on a computer or similar electronic device (e.g., a smartphone, tablet, etc.). Software means can run on the computer which is used for developing a new website or software means can run on a remote computer, i.e. the user can use the software as a service (SAAS). In this invention, technical and software means that implement the described copying and assistance method are called "equipment".

An exemplary method for developing a website is shown in FIG. 1. In step 101, a user of the method selects a website on the internet on the basis of which he plans to develop his own website. The address (URL) of the selected website is specified for the equipment implementing the method. The equipment is suitable for receiving a plurality of website addresses at once, i.e. in this invention, though, a term that refers to one site will be used, but the equipment may change, edit, and modify a plurality of (several thousand) copied websites at once. A possible option, when the equipment pre-specifies, offers possible websites that can be used by the user. The equipment analyses a structure, elements, DOM model of the selected website or a plurality of websites rather than the programming language code which is used for programming the selected website (step 103). The equipment analyses not the HTML code but the entire DOM model of both the copied website and linked websites. After analysing the DOM model, the equipment converts elements (such as a design, content, internal link tree, etc.) of the website into a unified template that can be used to adjust, edit, and modify converted elements in the operating environment (step 105). In this case, the programming language which is used for developing a code of the copied website is not important, the method operates with websites regardless of the programming language which is used for developing the website code. When implementing the method, the programming language which is used for developing the front-end interface and the back-end interface is not important, no matter what foreign language is used for providing information on the website, there may be interfaces between elements of the website and elements of other providers, external plugins, etc. The equipment analyses the selected website and provides the website and its DOM model in the operating environment, i.e. the equipment "understands" the structure of the copied website. The equipment unifies settings of the website and provides it in the operating environment, i.e., the equipment changes all the elements of the copied website into a single format which is used for providing elements in the operating environment, regardless of the method of production of elements. If the equipment is unable to unify elements of the copied website, the equipment interprets and provides them in the operating environment. The website selected in the operating environment is provided together with the information about the layout, importance, output, display order, sequence of elements of the website linked with coordinates of elements and other parameters. In the operating environment, the developer of the software may change the selected copied website (step 107). When changing the website, its elements, structure, functioning, interfaces can be changed, for example, it is possible to customize the website for displaying on mobile devices (in this case, customization for mobile and other devices is applied by default but it can be turned off if necessary) and etc. Also, in the operating environment, you can correct some errors on the selected website, such as aligning the pixels, installing SEO (customizing the website for searches), removing unnecessary, redundant, unused items and more. The operating environment of the method is designed such that the website developer may not have any programming skills, a change, modification of the copied site is performed in a graphical or other interface understandable for a non-specialist.

In this method, elements of the structure, programming language, operation, external plug-ins, interfaces with other websites, and other aspects of the structure and operation of the website selected to be copied. The described equipment copies any website by unifying its elements, moving unified elements into the operating environment, where elements can be edited.

In the operating environment, after changing the selected website according to your own criteria, the newly developed website can be hosted on a dedicated location on the computer, server. When the newly developed website is hosted on a specific server, the equipment customizes elements of the newly developed website in such a way that the newly hosted website and its parameters, settings will be suitable for settings, parameters of the server, i.e. the new website could operate on the specific server. When the website is hosted on a new server, the website is suitable for displaying on the internet, i.e. the website is suitable for use.

The equipment does not only develop a new website but also provides the developer, user with detailed instructions on how to develop a new website. The equipment providing assistance is implemented using artificial intelligence means. The equipment providing assistance monitors, registers and analyses actions of each website developer when developing a new website, thus forming a sequence, order of actions that are most commonly used to develop websites of a specific type. When using the most common stages of the sequence, order, i.e. using the sequence, order as a frame, direction, elements, structure, and peculiarities of the newly selected specific website are used. Assistance software means analyse actions of each developer when developing the website, uses elements of the website used by each specific developer, therefore the assistance system cannot operate separately from website development software means. When using such assistance software means, the developer receives tailored assistance to use the method for developing a website. One of the above mentioned forms of tailored assistance is dynamic, changing images that display the website development step by step. Other forms of tailored assistance are that the equipment itself can change, edit, modify the website in the same way as such or similar websites are changed according to the sequence, order of the most common actions performed by developers.

Another way of assisting a developer is to develop a dynamic image and display how a website can be copied by using the equipment implementing this method. When the website is moved to the operating environment, elements of the copied website are unified, i.e. the equipment analyses the copied website and moves it onto a unified template. After analysing and unifying the copied website, the equipment develops a dynamic video, the video clip on how a copied website can be developed using the equipment implementing this method (step 109). When the developer is watching the dynamic assistance video clip, he as a possibility to understand how one or another element, structure of the website can be developed using the equipment. The video clip can be paused, started from the beginning, accelerated, i.e. all the actions that are typical for video clips can be performed. The equipment can develop the website itself and display the development to the developer, the developer can at some point stop the development and continue to develop independently, construct the website according to his needs. The equipment can operate both with the externally copied website and with websites inside the system (selected from templates or developed earlier).

Software means of the equipment implementing the described method have artificial intelligence means that monitor actions of each developer when developing a new website, process it, systemizes it, develops the most common sequences, order of actions. One of ways in which a developed sequence of actions is used is that the sequence of actions is used to teach less experienced developers to develop websites, stages of website development are displayed step by step. Other possible uses of the developed sequence, order is that the equipment independently provides, offers samples of the most used websites for copying to the developer, provides, offers the developer further, following elements, steps, stages of website development. Artificial intelligence can also be used for other website development purposes.

The entire method for developing a website by copying has the following stages:
- an URL of the copied website is specified for the equipment;
- the equipment analyses elements of the structure of the website and the structure of its operation, the DOM model;
- the equipment converts elements of the structure of the copied website and the structure of its operation into a unified template, operating environment;
- when the equipment has analysed the copied website, at the request of the developer, the equipment displays stages of website development step-by-step, i.e. it teaches how to develop a new website through elements of a specific website;
- in an operating environment, the developer of the website edits, changes, modifies elements of the structure of the website and the structure of its operation;
- when hosting the newly developed website with the changed structure of the website and the structure of its operation on the server for displaying on the internet. The equipment changes parameters, settings of the new website according to settings, requirements of the server, i.e. it customizes the website for hosting on a specific server;
- the equipment hosts a new website on the server, where the new website is suitable for operation, for displaying on the internet.

In order to illustrate and describe the invention, the description of the preferred embodiments is presented above. This is not a detailed or restrictive description to determine the exact form or embodiment. The above description should be viewed more than the illustration, not as a restriction. It is obvious that specialists in this field can have many modifications and variations. The embodiment is chosen and described in order to best understand the principles of the present invention and their best practical application for the various embodiments with different modifications suitable for a specific use or implementation adaptation. It is intended that the scope of the invention is defined by the definition added to it and its equivalents, in which all of these definitions have meaning within the broadest limits, unless otherwise stated.

In the embodiments described by those skilled in the art, modifications may be made without deviating from the scope of this invention as defined in the following definition.

The invention claimed is:

1. A method for developing a website by copying another website and for providing tailored assistance for development comprising the steps of:
    specifying a URL of a copied website for a software means implementing the method;
    at a computer or server level, a developer of the website edits, changes, modifies elements including at least one of a design, content and internal link tree of a structure of the copied website and a structure of its operation;
    wherein the software means hosts a new website on a server comprising the following stages:
    the software means analyzing the elements of the structure of the copied website and the structure of its operation and a DOM model of the copied website;
    the software means converting and unifying the elements of the structure of the copied website and the structure of its operation into a unified template and operating environment,
    wherein after the steps of analyzing and unifying, upon the request of the developer, further comprising the step of creating a dynamic video clip specific to every single webpage on how each element of the copied website can be developed.

2. The method for developing a website by copying another website and for providing tailored assistance for development according to claim 1, wherein each dynamic video clip is based on the developer's operating environment, structure and elements of a specific webpage.

3. The method for developing a website by copying another website and for providing tailored assistance for development according to claim 1, wherein when hosting a newly developed website with the changed element structure of the copied website and the structure of its operation on the server for displaying on the internet, the software means changes parameters, settings of the new website according to settings, requirements of the server, including wherein the software means customizes the website to be hosted on the specific server in such a way, that website changes are made at the server level, not at a webpage level.

4. The method for developing a website by copying another website and for providing tailored assistance for development according to claim 1, wherein the software of the software means have artificial intelligence means which, at the request of the developer, can assist in developing the website, offer further steps of development for each user, depending on their previous actions while creating webpages.

5. The method for developing a website by copying another website and for providing tailored assistance for development according to claim 1, wherein at the request of the developer, the software means may develop a new website based on a sequence, order of the most commonly performed development actions by other users.

6. The method for developing a website by copying another website and for providing tailored assistance for development according to claim 1, wherein the software means copy and process, namely they change, modify and edit many different websites at once.

7. The method for developing a website by copying another website and for providing tailored assistance for development according to claim 1, wherein artificial intelligence creates the dynamic specific video clip for every single webpage, based on the developer's operating environment, structure and elements of a specific webpage.

* * * * *